United States Patent
Lyu (12)

(10) Patent No.: US 6,196,914 B1
(45) Date of Patent: Mar. 6, 2001

(54) CEILING GRILLE FOR AIR CONDITIONER OF RECREATIONAL VEHICLE

(75) Inventor: Jeong-Un Lyu, Kwangju (KR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/351,446

(22) Filed: Jul. 12, 1999

(51) Int. Cl.[7] ........................................ F24F 13/15
(52) U.S. Cl. ...................... 454/153; 454/285; 454/318
(58) Field of Search .................................. 454/136, 137, 454/153, 155, 256, 258, 285, 313, 318, 321

(56) References Cited

U.S. PATENT DOCUMENTS

| | | | |
|---|---|---|---|
| 4,018,159 | * | 4/1977 | Bennett .............................. 454/285 |
| 4,676,146 | * | 6/1987 | Takahashi et al. ................ 454/153 X |
| 5,586,935 | * | 12/1996 | Kotoh et al. ..................... 454/285 X |
| 5,738,580 | * | 4/1998 | Baek ................................. 454/285 |

FOREIGN PATENT DOCUMENTS 57-148132 * 9/1982 (JP) ..................................... 454/153

* cited by examiner

*Primary Examiner*—Harold Joyce

(57) ABSTRACT

A ceiling grille for an air conditioner of a recreational vehicle having a blade capable of being automatically pivoted. The ceiling grille comprises: a cam rotated by a motor for providing upward and downward moving forces, the cam having a camming surface formed at one end thereof; a link pivotally fastened to a bracket mounted to the ceiling grille, the link having one end on which a first projection is formed and the other end on which a second projection is formed, the first projection being brought into contact with the camming surface of the cam; an arm having one end secured to a center shaft of the blade to be integrally rotated therewith and the other end brought into contact with the second projection of the link; and a torsion spring wound around the center shaft for biasing the blade in one direction, whereby the blade is pivoted together with the center shaft as the cam is rotated by the motor. The blade has a hook member, and the ceiling grille has a locking clip. When the hook member is locked into the locking clip, an air outlet which is defined in the ceiling grille and in which the blade is disposed, is closed.

2 Claims, 3 Drawing Sheets

CEILING GRILLE FOR AIR CONDITIONER OF RECREATIONAL VEHICLE

BACKGROUND OF THE INVENTION

1. Field of the Invention

The present invention relates to a ceiling grille for an air conditioner mounted to a roof panel of a vehicle for air-conditioning a passenger compartment to thereby afford comfortable on-board environment. More particularly, the present invention relates to a ceiling grille for an air conditioner of a recreational vehicle, in which a blade can automatically and continuously change a direction of air flow discharged into a passenger compartment, whereby improving cooling efficiency of the air conditioner.

2. Description of the Prior Art

Generally, an air conditioner mounted to a roof panel of a vehicle is of benefit to ease an air flow passing through an evaporator and to uniformly deliver cooled air to front and rear portions of a passenger compartment.

An air conditioner for a recreational vehicle performs its air-conditioning function by intaking warm air from a passenger compartment through both sides of a ceiling grille, passing the warm air through a heat exchanger, conveying cooled air to a center portion of the cei ing grille via a blower, and discharging the cooled air forward anc rearward to cool the passenger compartment.

A ceiling grille for an air conditioner of a recreational vehicle has a pair of blades disposed at front and rear ends thereof, respectively, through which cooled air is discharged into a passenger compartment. Each of the pair of blades serves to adjust a direction of air flow discharged through it while being manually pivoted about a horizontal center shaft.

However, in the ceiling grille of the prior art, constructed as mnentioned above, it is bothersome for a passenger to manually pivot the blade to change the direction of the air flow. Also, cooling efficiency is reduced in that the cooled air is concentrically discharged to a portion of the passenger compartment unless otherwise the blade is manually and continuously pivoted.

In other words, when the cooled air is concentrically discharged to a portion of the passenger compartment, a passenger seated adjacent to the portion may be overly exposed to cooled air while another passenger seated remote from the portion may be deficiently exposed to cooled air.

SUMMARY OF THE INVENTION

Accordingly, the present invention has been made in an effort to solve the problems occurring in the prior art, and an object of the present invention is to provide a ceiling grille for an air conditioner of a recreational vehicle, in which a blade can automatically and continuously change a direction of an air flow discharged into a passenger compartment to uniformly distribute the air flow while being pivoted about a horizontal center shaft by a motor, whereby improving cooling efficiency.

In order to achieve the above object, according to one aspect of the present invention, there is provided a ceiling grille for an air conditioner of a recreational vehicle, the ceiling grille having a blade capable of being automatically pivoted, the ceiling grille comprising: a cam rotated by a motor for providing upward and downward moving forces, the cam having a camming surface formed at one end thereof; a link pivotally fastened to a bracket mounted to the ceiling grille, the link having one end on which a first projection is formed and the other end on which a second projection is formed, the first projection being brought into contact with the camming surface of the cam; an arm having one end secured to a center shaft of the blade to be integrally rotated therewith and the other end brought into contact with the second projection of the link; and a torsion spring wound around the center shaft for biasing the blade in one direction, whereby the blade is pivoted together with the center shaft as the cam is rotated by the motor.

Accordina to another aspect of the present invention, the blade has a hook member, and the ceiling grille has a locking clip. When the hcok member is locked into the locking clip, an air outlet which is defined in the ceiling grille and in which the blade is disposed, is closed.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
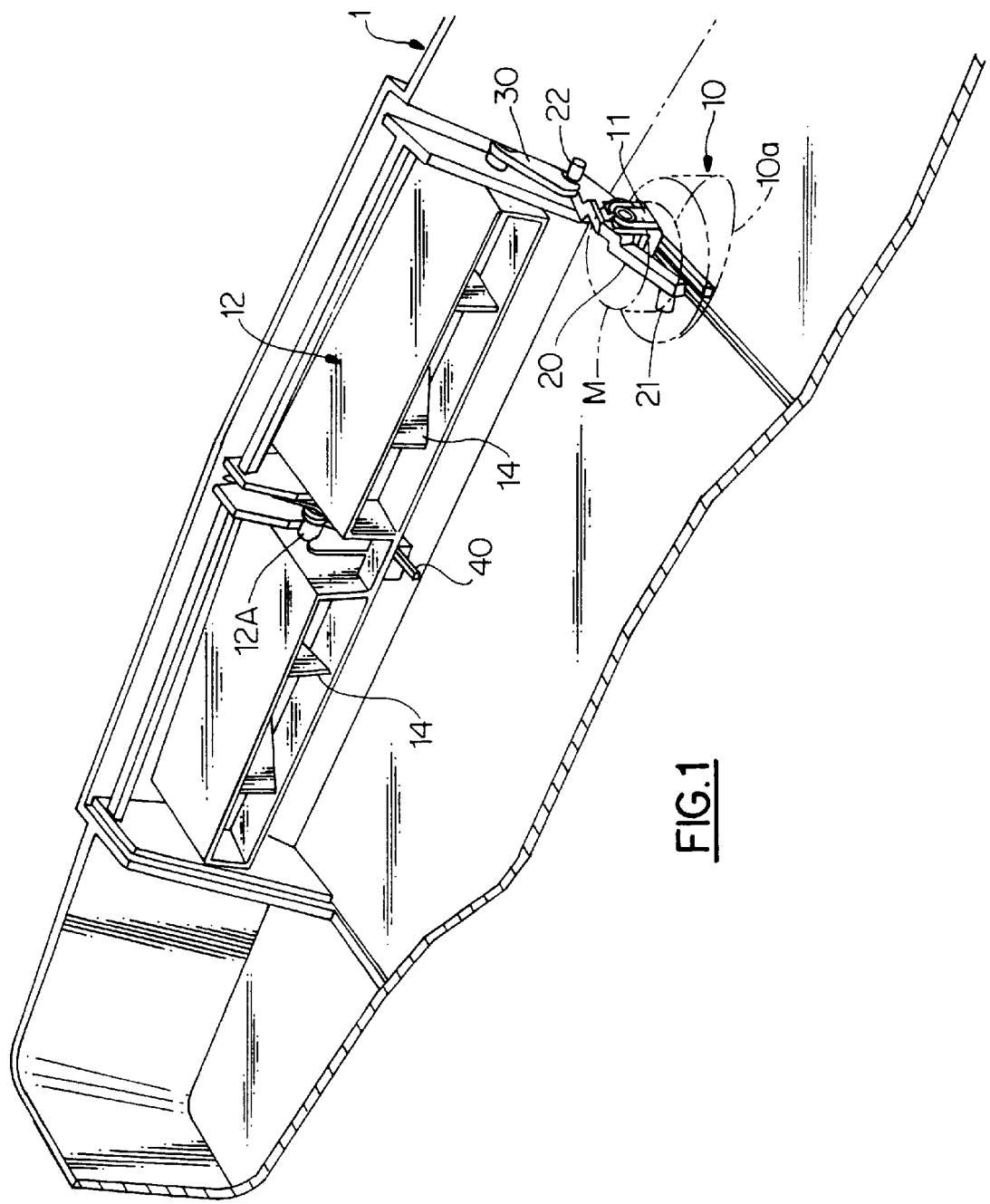
FIG. 1 is a perspective view of a ceiling grille for an air conditioner of a recreational vehicle, in accordance with an embodiment of the present invention.

Reference will now be made in greater detail to a oreferred embodiment of the invention, an example of which is illustrated in the accompanying drawings. Wherever possible, the same reference numerals will be used throughout the drawings and the descrpotion to refer to the same or like parts.

A ceiling grille 1 for an air conditioner of a recreational vehicle has a horizontal blade 12 capable of being automatically pivoted. The ceiling grille 1 includes a cam 10 rotated by a motor M for providing upward and downward moving forces, the cam 10 having a camming surface 10a formed at a lower end thereof; a link 20 pivotally fastened to a bracket 11 mounted to the ceiling grille 1, the link 20 having a front end on which a first projection 21 is formed and a rear end on which a second projection 22 is formed, the first projection 21 being brought into contact with the camming surface 10a of the cam 10; an arm 30 having a rear end secured to a center shaft 12A of the horizontal blade 12 to be integrally rotated therewith and a front end brought into contact with the second projection 22 of the link 20; and a torsion spring 40 wound around the center shaft 12A for biasing the horizontal blade 12 downward, whereby the horizontal blade 12 is pivoted together with the center shaft 12A as the cam 10 is rotated by the motor M.

The horizontal blade 12 has a hook member 12B, and the ceiling grille 1 has a locking clip 13. When the hook member 12B is locked into the locking clip 13, an air outlet which is defined in the ceiling grille 1 and in which the horizontal blade 12 is disposed, is closed.

The drawing reference numeral 14 represents a vertical blade.

Hereinafter, operations of the ceiling grille 1 according to the present invention, constructed as mentioned above, will be described in detail.

The cam 10 is rotated by the motor M. When the cam 10 is rotated, the first projection 21 formed on the front end of the link 20 is always brought into contact with the camming surface 10a of the cam 10 due to the fact that the torsion spring 40 wound around the center shaft 12A biases downward the rear end of the link 20 via the horizontal blade 12 and the arm 30.

In a position shown in FIG. 1, the cam 10 is maintained in its top dead center, and the blade 12 is horizontally arranged.

Figure 2A:
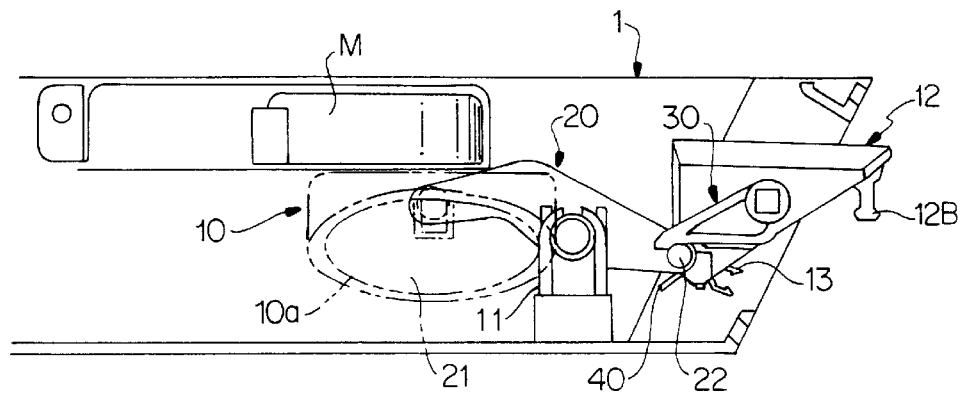
FIGS. 2a, 2b and 2c are side cross-sectional views illustrating operations of the ceiling grille of the present invention.

FIG. 2a is a side cross-sectional view illustrating the ceiling grille 1 held in the position shown in FIG. 1. When the cam 10 is rotated, the camming surface 10a of the cam 10 depresses the first projection 21, and the link 20 is pivoted in a counterclockwise direction. By this, the rear end of the link 20 is moved upward to cause the second projection 22 to raise the front end o fthe arm 30.

Figure 2B:
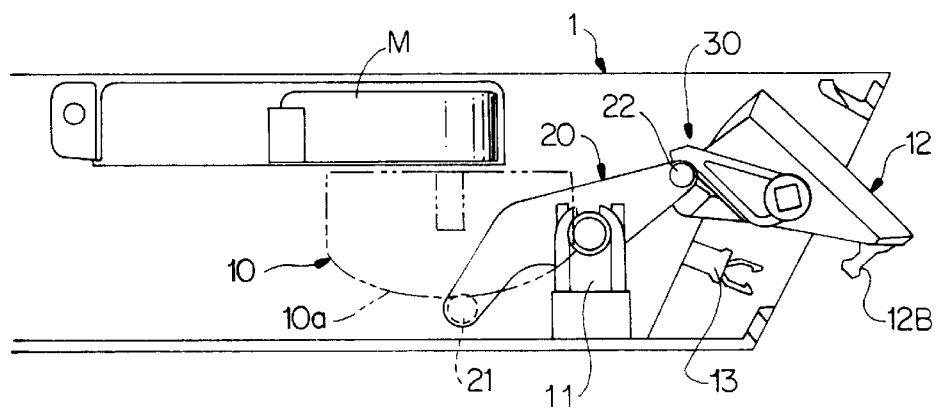

Accordingly, the blade 12 fixed to the rear end of the arm 30 via the center shaft 12A, is pivoted in a clockwise direction to change a direction of air flow discharged into the passenger compartment (see FIG. 2b).

At this time, the torsion spring 40 is maintained in a compressed state.

As the cam 10 is continuously rotated toward the top dead center after passing through a bottom dead center, the link 20 is pivoted in the clockwise direction, with the first projection 21 brought into contact with the camming surface 10a of the cam 10, to return the horizontal blade 12 to its original position as shown in FIGS. 1 and 2a.

By the fact that the cam 10 is continuously rotated by the motor M, the cooled air is discharged into the passenger compartment while being uniformly distributed.

Figure 2C:
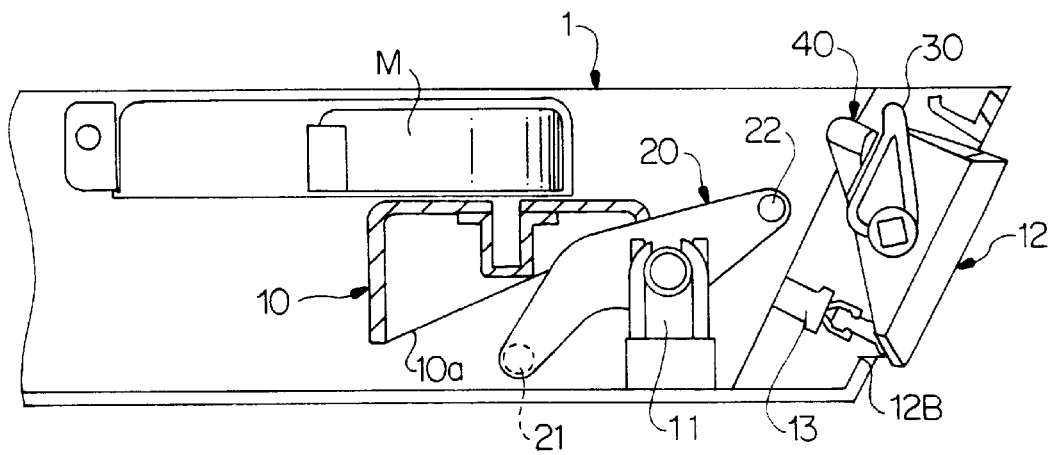
Figure 3:
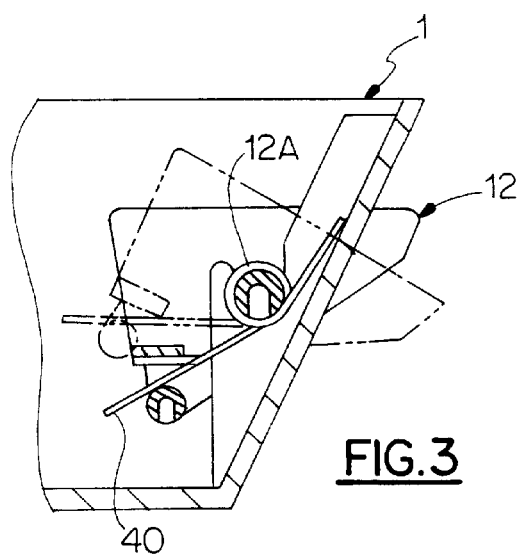
FIG. 3 is a side cross-sectional view illustrating a state in which a torsion spring is wound around a center shaft.

Although the above descriptions are mainly directed to an automatic mode during which the motor M is turned on, when it is required to close an air outlet in which the horizontal blade 12 is disposed, the hook member 12B is locked into the locking clip 13 in a manual mode in which the motor M is turned off (see FIG. 2c).

As a result, according to the present invention, advantages are provided in that a blade provided to a ceiling grille for an air conditioner of a recreational vehicle, can automatically and continuously change a direction of an air flow discharged into a passenger compartment, to thereby improve cooling efficiency of the air conditioner.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A ceiling grille for an air conditioner of a recreational vehicle, the ceiling grille having a blade capable of being automatically pivoted, the ceiling grille comprising:

a cam rotated by a motor for providing upward and downward moving forces, the cam having a camming surface formed at one end thereof;

a link pivotally fastened to a bracket mounted to the ceiling grille, the link having one end on which a first projection is formed and the other end on which a second projection is formed, the first projection being brought into contact with the camming surface of the cam;

an arm having one end secured to a center shaft of the blade to be integrally rotated therewith and the other end brought into contact with the second projection of the link; and a torsion spring wound around the center shaft for biasing the blade in one direction, whereby the blade is pivoted together with the center shaft as the cam is rotated by the motor.

2. The ceiling grille as claimed in claim 1, wherein the blade has a hook member, and the ceiling grille has a locking clip, the hook member being able to be locked into the locking clip for closing an air outlet which is defined in the ceiling grille and in which the blade is disposed.

* * * * *